Sept. 23, 1930.  C. M. ZUBLER  1,776,647
ANTIFRICTION BEARING
Filed Dec. 28, 1929
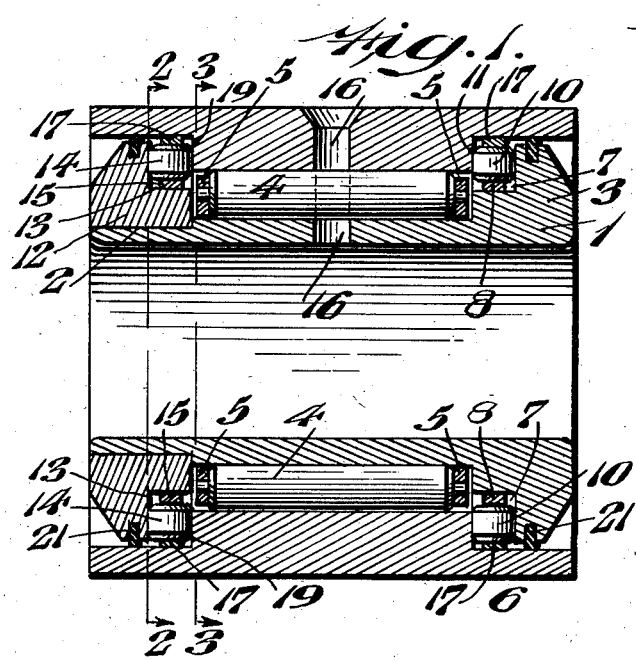
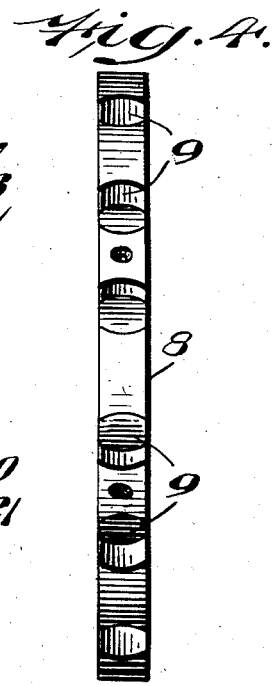
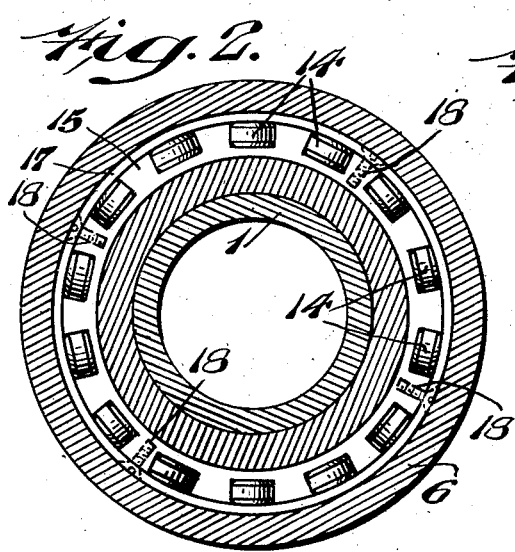
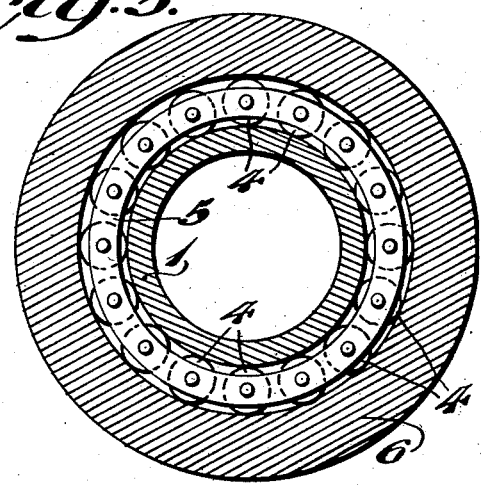
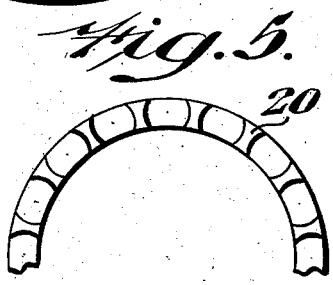
INVENTOR.
CAMP M. ZUBLER.
BY
ATTORNEYS.

Patented Sept. 23, 1930

1,776,647

UNITED STATES PATENT OFFICE

CAMP M. ZUBLER, OF DREXEL HILL, PENNSYLVANIA

ANTIFRICTION BEARING

Application filed December 28, 1929. Serial No. 417,021.

The leading object of the present invention resides in the provision of a novel anti-friction bearing, having auxiliary rollers particularly adapted to take up radial and end thrusts whose axes are disposed at right angles to the horizontal axes of the main solid rollers, in conjunction with a novel manner of collocating and assembling said rollers, dust excluding rings and their adjuncts.

A further object of the present invention is to provide an anti-friction bearing of the character above stated which is especially adapted for railway car journals and other heavy duty requirements.

A further object of the present invention is to provide means whereby the bearing may be thoroughly lubricated through both the outer and inner bearing casings.

A further object of the present invention resides in the provision of novel features of construction and arrangement and combination of parts for attaining the results sought by the foregoing objects.

The invention consists of the novel construction hereinafter described and finally claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

The nature, characteristic features, and scope of the invention will be more fully understood from the following description taken in connection with the accompanying drawings forming part thereof, in which Figure 1 represents a longitudinal section of an antifriction bearing embodying my invention.

Figure 2 represents a view in cross section taken on line 2—2 Figure 1.

Figure 3 represents a similar view taken on line 3—3 Figure 1.

Figure 4 represents a side elevation illustrating the cage which supports the auxiliary rollers.

Figure 5 represents a fragmentary view in end elevation of a cage which supports the main roller of the bearing.

Similar numerals of reference indicate corresponding parts.

In the manufacture of my novel anti-friction bearing, I employ a cylindrical sleeve 1 having a central bore which is adapted to receive the end of an axle. The outer end of the sleeve 1 is provided with a reduced portion 2 forming an annular shoulder, the purpose of which will presently appear. The opposite or inner end of the sleeve 1 has formed integral therewith an enlarged shoulder 3. Intermediate the portions 2 and 3, there is formed the annular race-way for accommodating the main solid rollers 4, having reduced ends which are rotatably supported within the cage 5. The rotary casing member 6 of the bearing is movable around said main rollers 4, which in practice are solid. The inner end of the shoulder 3 of the inner sleeve 1 is provided with an annular recessed portion 7, within which is arranged a vertically disposed cage 8, see Figure 4, provided with pockets 9 for the accommodation of auxiliary rollers 10, the axes of which are arranged at right angles to the axes of the main rollers 4. The outer casing 6 is provided with a right angle formation or wall 11 which cooperates with the portion 7 to provide an annular race-way for the vertically disposed auxiliary rollers 10, as is clearly shown in Figure 1. Thus the recessed part of the shoulder 3 of the inner sleeve 1 and the juxtaposed parallel wall 11 of the outer casing provide contact surfaces upon which the auxiliary rollers 10 rotate in the movement of the inner sleeve with respect to the outer casing. The outer race-way of the outer auxiliary roller bearings is separate and apart from the main bearing parts and is designated 12, see Figure 1, and is forced into the outer casing 6 and over the reduced portion 2 of the inner cylinder, as clearly shown in Figure 1. This outer race way 12 is provided with a recessed portion or wall 13, which is parallel to the wall 19 and accommodates a second series of rollers 14 supported in a cage 15, the rollers and cage being similar in all respects to the previously described rollers and cage, it being understood that the vertical axes of the auxiliary rollers 14 are also at right angles to the axes of the horizontally disposed main rollers 4, and said auxiliary rollers 14 contact with the juxtaposed parallel walls 13 and 19.

By the employment of the auxiliary rollers 10 and 14 as above described, excessive end thrust loads can be safely sustained, and in fact from three to four times more load can be carried than where balls are employed. Thus, the present anti-friction bearing may be efficiently employed in railway car journals and other heavy duty requirements where balls would be inefficient for end thrust loads and could not sustain load pressures.

16 designates an oil hole or lubricating passage arranged in the outer casing and inner sleeve 6 and 1 respectively, and said oil hole and lubricating passage extends entirely through the casing 6, so as to communicate with the passage which extends through the inner sleeve 1. Thus the solid rollers 4 may be lubricated either from above or from below, as is clearly illustrated in Figure 1.

The auxiliary roll retaining cages are arranged to receive the auxiliary rollers 10 and 14 as described and in order to retain said rollers in place, I use the outer rings 17 secured to the respective cages by means of screws 18, as best seen in Figure 2.

In Figures 1 and 2 I have shown the solid main rollers 4 as provided with journals rotatably mounted in the cages 5, but if desired I may omit said journals and mount the ends of said rollers directly in cages like the cages 20 seen in Figure 5 or I may omit said cages if necessary. The dust excluding rings 21, see Figure 1, are split metallic rings, constructed somewhat similar to a piston ring and are readily snapped into their seats, as will be understood from Fig. 1. The auxiliary rollers 10 and 14 are mounted in cages separate and distinct from the cages 5 of the main solid rollers 4, and said auxiliary rollers at their inner surfaces contact with the solid integral parallel walls 11 and 19 of the outer casing. The opposite peripheral portions of the auxiliary rollers 10 and 14 contact with the parallel solid walls 7 and 13, the construction being such that the auxiliary rollers and their cages are entirely separate and distinct from the cages 5 of the main rollers 4.

It will be further apparent that the portions 3 and 12 which take up end thrusts are of considerable thickness so that a very durable and efficient bearing is provided, the main elements 1, 6 and 12 of which are only three in number whereby the cost of production and of assembly is reduced to a minimum.

If desired any suitable fastening device may be employed to retain the member 12 within the counterbored portion 2. The auxiliary rollers 10 and 14 are readily positioned within their respective cages and are effectively held in position by the rings 17 and the fastening devices 18. The rollers 10 and 14 have their opposite ends substantially parallel, and it will of course be understood that a sufficient amount of play is provided between their respective cages and the outer inclosing rings, so that said rollers are freely rotatable. It will be further understood that the main rollers 4 are solid and that they contact directly with the contiguous portions of the inner sleeve 1, and the outer casing 6, so that the use of interposed sleeves or rings between the bearing surfaces of said rollers 4 and the inner sleeve and outer casing is dispensed with.

It will be apparent that I have devised a novel and useful construction of antifriction bearing which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:

In a device of the character stated, an anti-friction bearing comprising inner and outer rotary anti-friction sleeve and casing members disposed coaxially with respect to one another, a series of solid main rollers operatively interposed directly between and in direct contact with the contiguous walls of said rotary members, cages for supporting the ends of said solid rollers, an outwardly extending integral annular flange of relatively thick cross-section carried by the inner end of said inner sleeve member and overlapped by the overhanging right angled annular end of said outer casing member, which is of relatively thin cross-section and which flange contains an annular, auxiliary roller receiving chamber, an oppositely disposed removable member also of relatively thick cross-section and having an annular, auxiliary roller receiving chamber, fitted to the shouldered end of said inner sleeve member and overlapped by the juxtaposed overhanging end of said outer casing member, auxiliary rollers arranged wholly within and concealed by said chambers between the juxtaposed faces of said outer and inner rotary members, the axes of said auxiliary rollers being disposed at a right angle to the axes of said main rollers, cages for the ends of main rollers, annular independent cages for said auxiliary rollers, said latter cages being positioned outside of the plane of said cages for said main rollers, metallic retaining rings positioned wholly within said chambers and arranged annularly of said cages for retaining said auxiliary rollers in place.

CAMP M. ZUBLER.